US011714797B2

(12) United States Patent
Sanders et al.

(10) Patent No.: US 11,714,797 B2
(45) Date of Patent: Aug. 1, 2023

(54) LOGICALLY CONSISTENT ARCHIVE WITH MINIMAL DOWNTIME

(71) Applicant: MICRO FOCUS LLC, Santa Clara, CA (US)

(72) Inventors: Daniel S. Sanders, Provo, UT (US); Peeyush Paliwal, Houston, TX (US); Polina Alber, Cambridge, MA (US)

(73) Assignee: Micro Focus LLC, Santa Clara, CA (US)

(*) Notice: Subject to any disclaimer, the term of this patent is extended or adjusted under 35 U.S.C. 154(b) by 18 days.

(21) Appl. No.: 17/157,830

(22) Filed: Jan. 25, 2021

(65) Prior Publication Data

US 2022/0237173 A1  Jul. 28, 2022

(51) Int. Cl.
*G06F 16/23* (2019.01)

(52) U.S. Cl.
CPC ...... *G06F 16/2358* (2019.01); *G06F 16/2343* (2019.01); *G06F 16/2379* (2019.01)

(58) Field of Classification Search
CPC ............ G06F 16/2358; G06F 16/2343; G06F 16/2379; G06F 16/113
See application file for complete search history.

(56) References Cited

U.S. PATENT DOCUMENTS

| 7,287,048 | B2 | 10/2007 | Bourbonnais et al. | |
| 7,412,460 | B2 | 8/2008 | Hrle et al. | |
| 8,712,970 | B1 | 4/2014 | Sim-Tang | |
| 9,886,439 | B2 | 2/2018 | Prabhu et al. | |
| 10,229,152 | B2 | 3/2019 | Bourbonnais et al. | |
| 10,254,996 | B1* | 4/2019 | Jain | G06F 16/214 |
| 2005/0086445 | A1* | 4/2005 | Mizuno | G06F 11/1458 711/162 |
| 2008/0162601 | A1* | 7/2008 | Chen | G06F 16/1734 |
| 2011/0153351 | A1* | 6/2011 | Vesper | G16H 30/20 705/2 |
| 2013/0024426 | A1* | 1/2013 | Flowers | G06F 11/1456 707/654 |
| 2013/0325812 | A1* | 12/2013 | Carter | G06F 16/113 707/661 |
| 2015/0242247 | A1* | 8/2015 | Chessell | G06F 9/526 710/200 |
| 2016/0188611 | A1* | 6/2016 | Prabhu | G06F 16/2358 707/672 |

OTHER PUBLICATIONS

Kai, et al; Minimizing Downtime During Large Database Migrations With Oracle Data Guard; Dell Power Solutions; Aug. 2007; 4 pages.

* cited by examiner

*Primary Examiner* — Mariela Reyes
*Assistant Examiner* — Fatima P Mina
(74) *Attorney, Agent, or Firm* — Sheridan Ross P.C.

(57) ABSTRACT

A sub-archive is initiated. The sub-archive saves changes that have occurred since a previous final archive. Changes to an operational database (i.e., the operational database that is being archived) are allowed during the first sub-archive. A final archive is initiated in series after the sub-archive has completed. The final archive does not allow changes to the operational database when the final archive is active. In one embodiment, the sub-archive may comprise a plurality of sub-archives that depend on an amount of outstanding changes that exist in the operational database.

17 Claims, 4 Drawing Sheets

LOGICALLY CONSISTENT ARCHIVE WITH MINIMAL DOWNTIME

FIELD

The disclosure relates generally to archive systems and particularly to advanced archive systems that minimize downtime.

BACKGROUND

There are various methods for doing a database backup (e.g., warm, hot, hot-continuous). At first glance, a backup process may seem similar to an archival process; however, it is very important to distinguish an archive process from a backup process. A backup is a copy of the database as of some point in time. The backup includes all inserts, updates, and deletes that have been made to the database up to that point in time.

On the other hand, an archive is designed to preserve historical data. An archive contains updates made to the operational database over time, so an archive will not necessarily delete all of the data that is deleted from the operational database like a backup process does. For an archive process to work properly, it must be considered "consistent" and also be able capture historically related transactions between objects over time. This is why traditional backup processes cannot be used in an archival process.

One way to achieve a consistency during an archive is to shut down all processes that update the operational database and then archive only data in the operational database that has changed since the last archive was taken. Shutting down the operational database does guarantee a consistent archive because the operational database is in a state that is known to be fully logically consistent. When the operational database is shut down, nothing can make changes that would alter that consistent state. Even though the archive process is architected to only archive changes that had occurred since the last archive (an incremental archive), there can still be a large number of changes that have occurred since the last archive. When the operational database is shutdown, this prevents users from doing work while the archive process is occurring. In large operational database systems, users could be locked out for many hours or even days.

SUMMARY

These and other needs are addressed by the various embodiments and configurations of the present disclosure. A sub-archive is initiated. The sub-archive saves changes that have occurred since a previous final archive. Changes to an operational database (i.e., the operational database that is being archived) are allowed during the first sub-archive. A final archive is initiated in series after the sub-archive has completed. The final archive does not allow changes to the operational database when the final archive is active. In one embodiment, the sub-archive may comprise a plurality of sub-archives that depend on an amount of outstanding changes that exist in the operational database.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(1) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
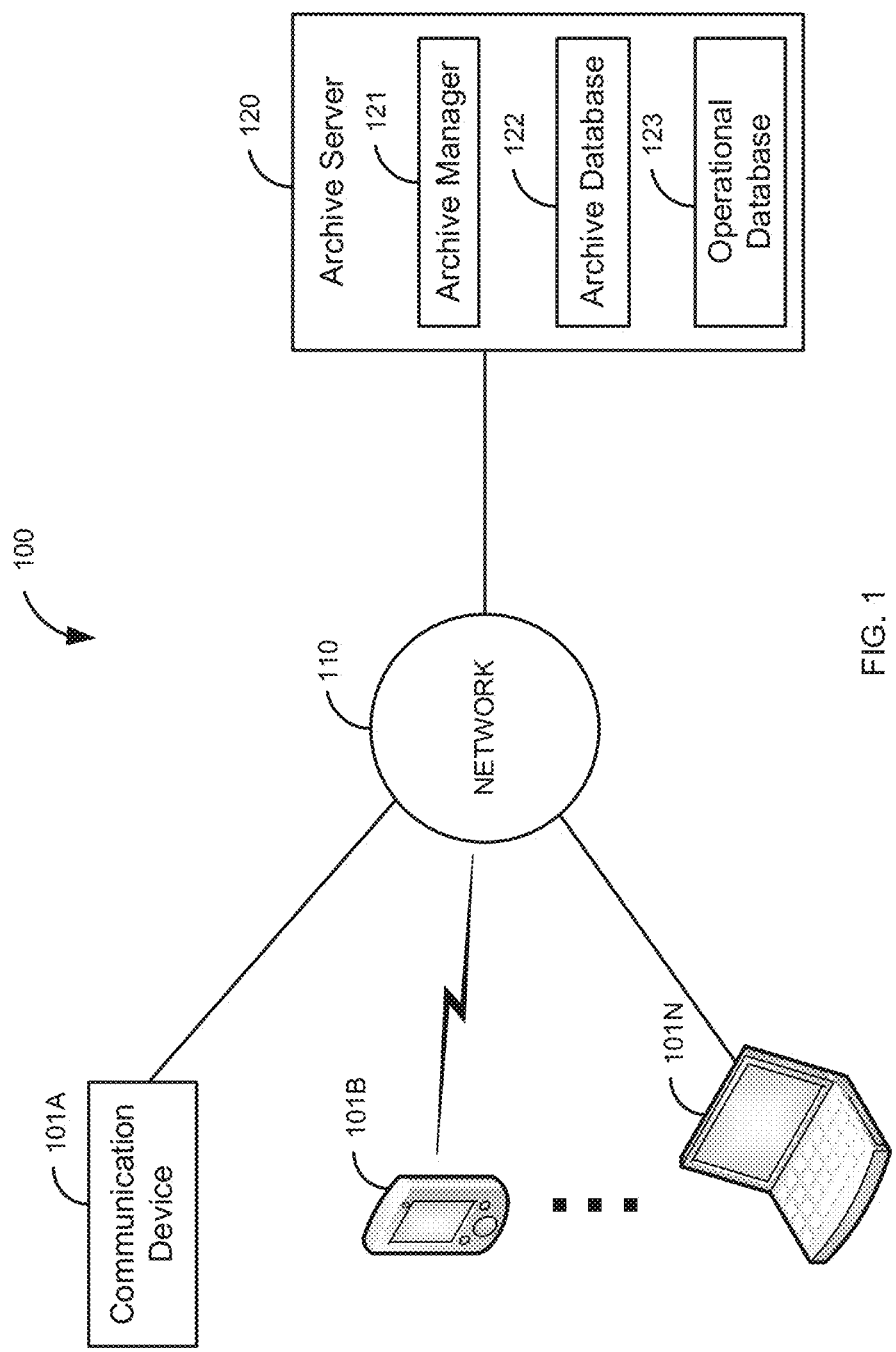
FIG. 1 is a block diagram of a first illustrative system that produces an archive process that has a minimal down time.

FIG. 1 is a block diagram of a first illustrative system 100 that produces an archive process that has a minimal down time. The first illustrative system 100 comprises communication devices 101A-101N, a network 110, and an archive server 120.

The communication devices 101A-101N can be or may include any device that can communicate on the network 110 to access the archive server 120, such as a Personal Computer (PC), a cellular telephone, a Personal Digital Assistant (PDA), a tablet device, a notebook device, a smart phone, a server, and the like. As shown in FIG. 1, any number of communication devices 101A-101N may be connected to the network 110, including only a single communication device 101. The communication devices 101A-101N are used to access the archive database 122 and the operational database 123.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The archive server 120 can be or may include any hardware coupled with software that can archive an operational database 123. The archive server 120 may comprise a plurality of archive servers 120. The archive server 120 comprises an archive manager 121, the archive database 122, and the operational database 123.

The archive manager 121 can be or may include any hardware/software that can perform an archive process. The archive manager 121 can be a distributed archive manager 121 that is distributed on multiple archive servers 120. The archive manager 121 is responsible for performing an archive of the operational database 123. As discussed above in the background section, an archive process is different from a backup process where the archive process includes history information over time, such as deletes.

The archive database 122 can be or may include any database that can provide an archive of the operational database 123. The archive database 122 stores an archive copy of the operational database 123. The archive database 122 may be a distributed archive database 122.

The operational database 123 can be or may include any kind of database, such as a relational database, a directory service, a Structured Query Language (SQL) database, a hierarchical database, a graph database, and/or the like. The operational database 123 may be a distributed operational database 123.

Figure 2:
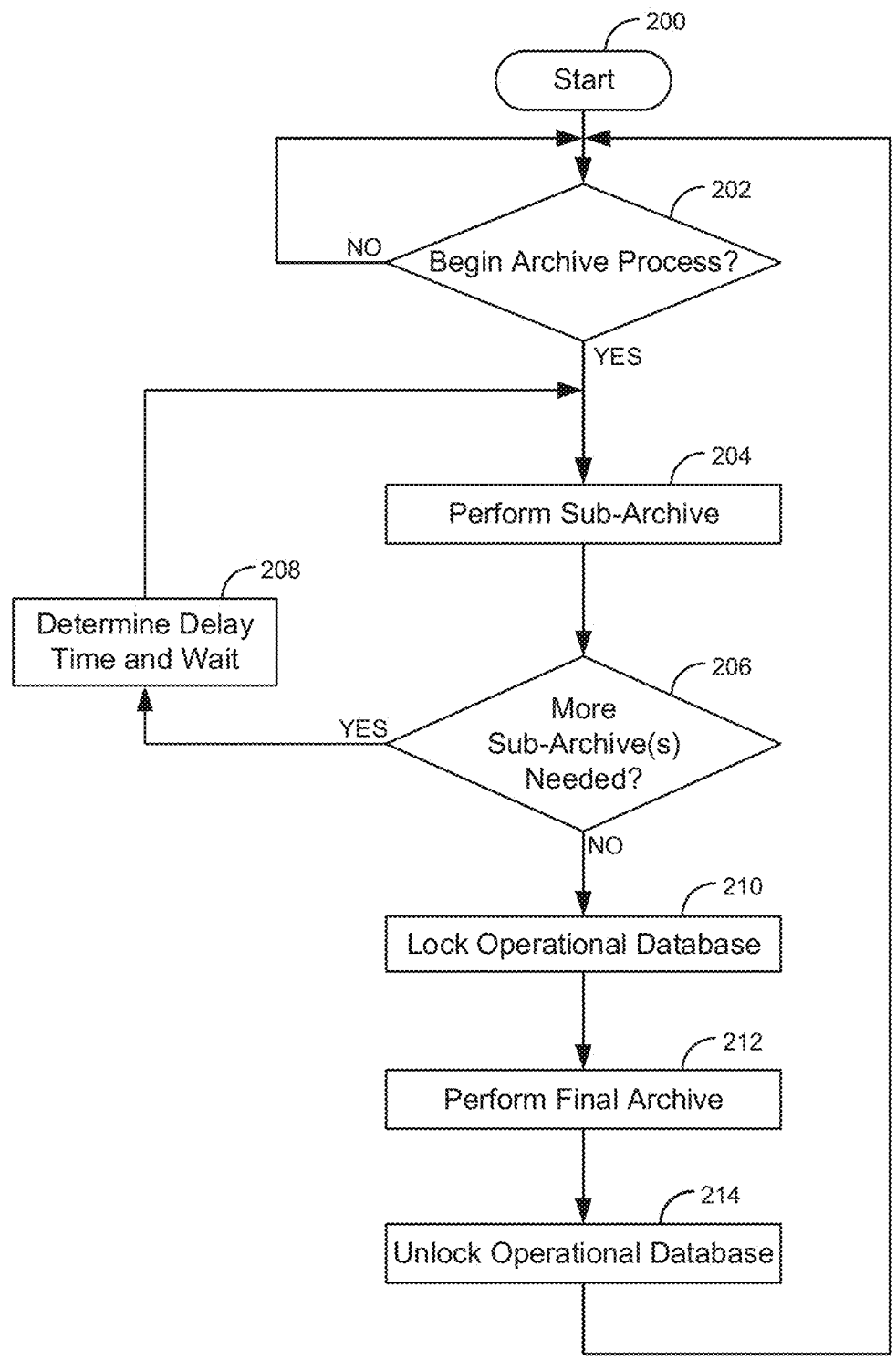
FIG. 2 is a flow diagram of an archive process that has a minimal down time.
Figure 3:
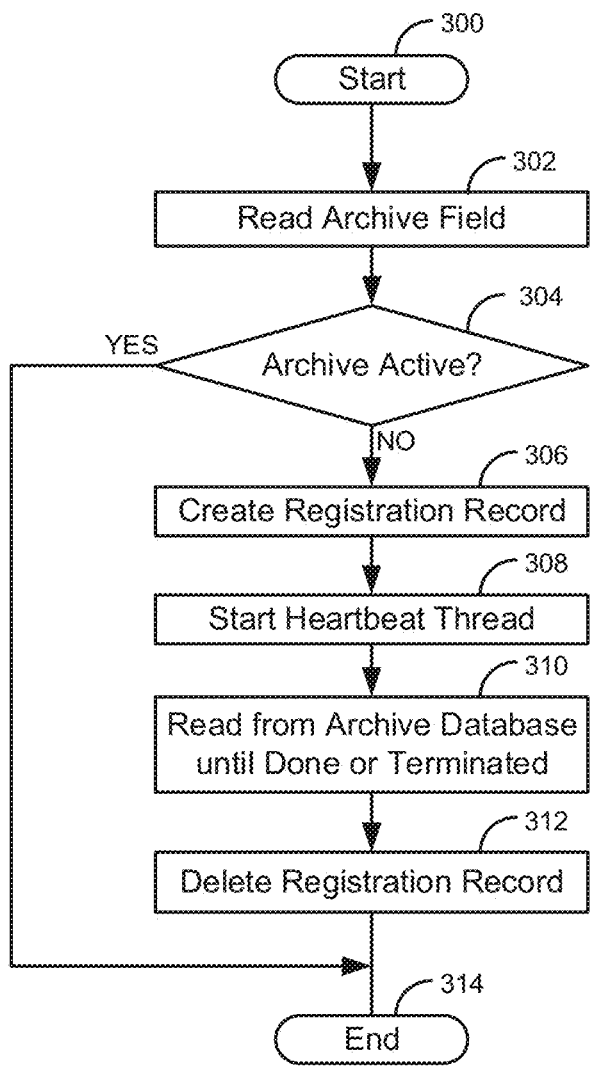
FIG. 3 is a flow diagram of a process for managing reader access of an archive database during an archive.
Figure 4:
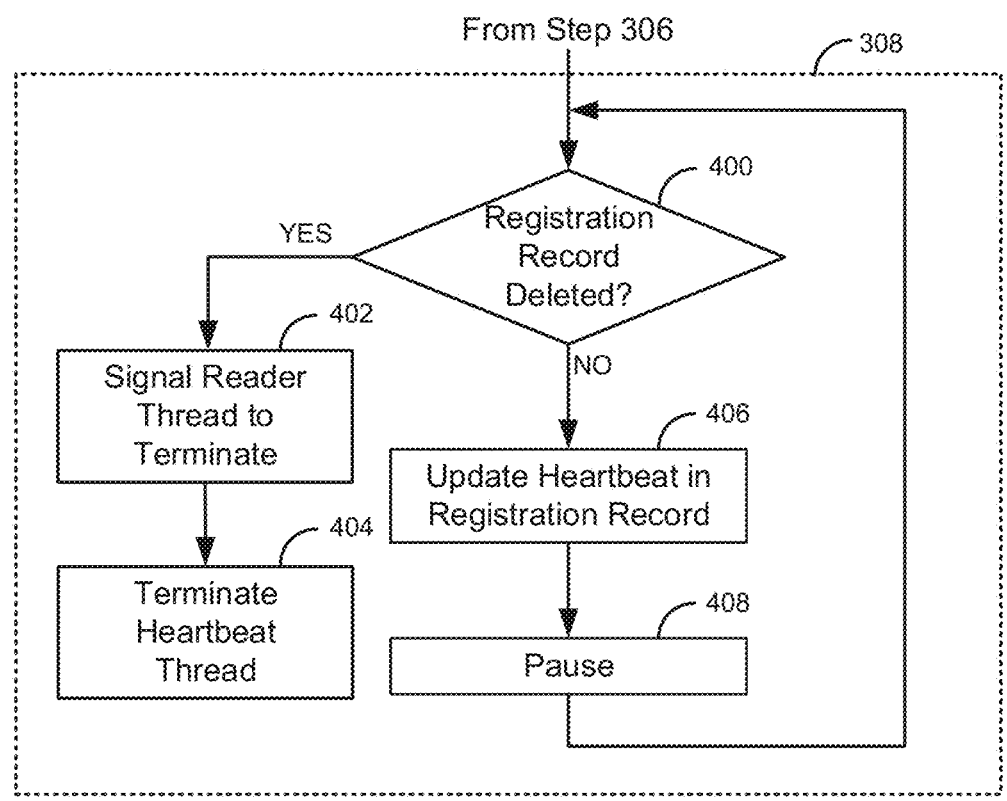
FIG. 4 is a flow diagram of a process an archive system uses to identify that the reader is actively accessing an archive database.

FIG. 2 is a flow diagram of an archive process that has a minimal down time. Illustratively, the communication devices 101A-101N, the network 110, the archive server 120, the archive manager 121, the archive database 122, and the operational database 123 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The archive manager 121, determines, in step 202, if an archive process is to begin. The archive process may begin in various ways, such as, based on an archive schedule, based on an event, based on an administrator starting the archive process, and/or the like. If the archive process is not ready to begin in step 204, the process of step 202 repeats.

Otherwise, if the archive process is ready to begin in step 202, the archive manager 121 preforms a sub-archive in step 204. The sub-archive of step 204 (assuming that it is a first sub-archive) saves changes that have occurred since a previous archive (a complete archive) has taken place. When the sub-archive process of step 204 occurs, changes to the operational database 123 can still occur. In other words, users can still access the operational database 123 and make changes during the sub-archive process of step 204.

The archive manager 121 determines, in step 206, if more sub-archive(s) are needed in step 206. The archive manager 121 can determine if more sub-archive(s) are need based on various criteria. For example, the archive manager 121 may determine, in step 206, that there are still too many outstanding changes that need to be completed in the operational database 123. The number of outstanding changes can be based on a threshold of a number of outstanding changes. Alternatively, the number of sub-archive(s) may be based on a defined number (e.g., set by an administrator). In one embodiment, the number of sub-archive processes may be based on a threshold and a maximum number of sub-archives that are to take place.

If there are more sub-archive(s) needed in step 206, the archive manager 121 determines a delay time and then waits in step 208. The delay time between sub-archive(s) may vary based on the number of outstanding changes, may be based on a series of progressively smaller incremental time values, administratively defined, and/or the like. The process then performs the next sub-archive process in step 204.

In FIG. 2, the total number of sub-archive(s) performed may be any number from 1 to N, where N is an integer that defines the maximum number of sub-archives that will be performed. The number of sub-archive(s) may vary over time based on the amount of data that is being archived and/or other factors. For example, the number of sub-archive(s) may be two one time and eight the next time based on how much data is being archived.

If there are not any more sub-archive(s) needed in step 206, the archive manager 121 locks the operational database 123 in step 210. When the operational database 123 is locked in step 210, changes cannot be made to the operational database 123 (e.g., users cannot access the operational database 123). The archive manager 121 performs, in step 212, a final archive of the operational database 123. Once step 212 is completed, the archive process is complete. The archive manager 121 unlocks the operational database 123 in step 214. The process then goes back to step 202 to wait for the beginning of another archive process.

FIG. 3 is a flow diagram of a process for managing reader access of an archive database 122 during an archive. The process of FIG. 3 from the perspective of a reader (i.e., a user who wants to access the archive database 122).

The process starts in step 300. In step 302, the reader reads an archive field. The archive field may be a field in a table (e.g., in the archive database 122), a variable set in a file, and/or the like. The archive field is set by the archive manager 121 when the archive process begins (e.g., after step 202). The archive field is cleared after the final archive is performed in step 212.

If the archive field has been set (meaning an archive is active) in step 304, the process ends in step 314. Otherwise, if the archive field is not set step 304, the reader creates (e.g., using an Application Programming Interface (API)) a registration record in step 306. The creation of the registration record indicates that the reader is going to access the archive database 122. The archive manager 121 uses the registration record to help determine when to start an archive process. If there are reader(s) who are accessing the archive database 122, the archive manager 121 will delay the archive process until the reader(s) are done or until the reader(s) are notified of the archive.

The archive manager 121 starts, in step 308, a heartbeat thread. The heartbeat thread is a process where the reader updates a heartbeat field that indicates that the reader is still actively using the archive database 122. The process of step 308 is further described in FIG. 4. The reader reads from the archive database 122 until done or has been terminated (e.g., notified of an archive) in step 310. The reader then deletes the registration record in step 312 (if not already deleted by the archive manager 121). The process then ends in step 314.

FIG. 4 is a flow diagram of a process an archive system uses to identify that the reader is actively accessing the archive database 122. The process of FIG. 4 is an exemplary embodiment of step 308 of FIG. 3 (the heartbeat thread). After creating the registration record in step 308, the heartbeat thread is started. The heartbeat thread runs concurrently during step 310.

The process reads, in step 400, if the registration record has been deleted. The registration record may be deleted by the archive manager 121 to indicate that an archive process is going to be started. If the registration record has been deleted in step 400, a signal is sent to terminate the reader thread in step 402. The heartbeat thread is then terminated in step 402.

Otherwise, if the registration record has not been deleted in step 400, the reader (e.g., via an API) updates a heartbeat record in the registration record in step 406. The reader does this by setting the heartbeat value in the registration record to the current time, in step 406. If the reader fails to update this heartbeat timestamp on a regular interval, after a certain amount of time (e.g., an administered time) has elapsed since the last heartbeat timestamp, the archive manager 121 will assume that the reader terminated abnormally. If the reader has not updated the heartbeat record, the archive manager 121 deletes the registration record. Once the reader has updated the heartbeat record in step 406, the reader pauses in step 408. The pause may be for a defined period. For example, the pause may be for one second. The process then goes back to step 400.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a non-transitory computer readable medium, coupled with the microprocessor and comprising microprocessor readable and executable instructions that, when executed by the microprocessor, cause the microprocessor to:
initiate an archive process on an operational database, wherein the archive process comprises a sub-archive and a final archive, wherein the sub-archive comprises a plurality of sub-archives, and wherein the sub-archive and the final archive run in series;
initiate the sub-archive, wherein the sub-archive saves changes in the operational database that have occurred since a previous final archive, wherein a number of sub-archives in the plurality of sub-archives is based on a number of outstanding changes in the operational database since a previous final archive, wherein a delay time between each of the plurality of sub-archives is based on the number of outstanding changes in the operational database since the previous final archive and a series of progressively smaller incremental time values, and wherein changes to the operational database are allowed during the sub-archive;
receive a request from a user to access the operational database, and in response to the request to access the operational database, create a registration record for the user, wherein when the user is done accessing the operational database or when the user's access has been terminated the registration record is deleted; and
determine if the registration record exists: if the registration record exists, then do not initiate the final archive; and
if the registration record does not exist, then initiate the final archive, wherein no changes are allowed to the operational database during the final archive.

2. The system of claim 1, wherein the number of sub-archives is further based on at least one of:
a defined number of sub-archives; and
a maximum number of sub-archives.

3. The system of claim 1, wherein the sub-archive and the final archive comprise a complete archive.

4. The system of claim 1, wherein the delay time between each of the plurality of sub-archives is further based on
an administered value.

5. The system of claim 1, wherein the microprocessor readable and executable instructions further cause the microprocessor to:
read an archive field that indicates if the final archive is active, wherein if the final archive is active, all requests to access the operational database are denied.

6. The system of claim 1, wherein the registration record includes a heartbeat field indicating the user is actively accessing the operational database.

7. The system of claim 6, further comprising:
updating the heartbeat field to terminate a heartbeat thread when the user is done accessing the operational database.

8. A method comprising:
initiating, by a microprocessor, an archive process on an operational database, wherein the archive process comprises a sub-archive and a final archive, wherein the sub-archive comprises a plurality of sub-archives, and wherein the sub-archive and the final archive run in series;
initiating the sub-archive, wherein the sub-archive saves changes that have occurred since a previous final archive, wherein a number of sub-archives in the plurality of sub-archives is based on a number of outstanding changes in the operational database since a previous final archive, wherein a delay time between each of the plurality of sub-archives is based on the number of outstanding changes in the operational database since the previous final archive and a series of progressively smaller incremental time values, and wherein changes to the operational database are allowed during the sub-archive;
receiving a request from a user to access the operational database, and in response to the request to access the operational database, creating a registration record for the user, wherein when the user is done accessing the operational database or when the user's access has been terminated the registration record is deleted; and determining if the registration record exists:
if the registration record exists, then do not initiate the final archive; and
if the registration record does not exist, then initiate the final archive, wherein changes to the operational database are not allowed during the final archive.

9. The method of claim 8, wherein the number of sub-archives is further based on at least one of:
a defined number of sub-archives; and
a maximum number of sub-archives.

10. The method of claim 8, wherein the sub-archive and the final archive comprise a complete archive.

11. The method of claim 8, wherein the delay time between each of the plurality of sub-archives is further based on
an administered value.

12. The method of claim 8, further comprising:
reading an archive field that indicates if the final archive is active, if the final archive is active, all requests to access the operational database are denied.

13. The method of claim 8, wherein the registration record includes a heartbeat field indicating the user is actively accessing the operational database.

14. The method of claim 13, further comprising:
updating the heartbeat field to terminate a heartbeat thread when the user is done accessing the operational database.

15. A non-transitory computer readable medium having stored thereon instructions that cause a microprocessor to execute a method, the method comprising:
instructions to initiate an archive process on an operational database, wherein the archive process includes a sub-archive and a final archive, wherein the sub-archive comprises a plurality of sub-archives, and wherein the sub-archive and the final archive run in series;
instructions to initiate the sub-archive, wherein the sub-archive saves changes that have occurred since a previous final archive, wherein a number of sub-archives in the plurality of sub-archives is based on a number of outstanding changes in the operational database since a previous final archive, wherein a delay time between each of the plurality of sub-archives is based on the number of outstanding changes in the operational database since the previous final archive and a series of progressively smaller incremental time values, and wherein changes to the operational database are allowed during the sub-archive;

instructions to determine a request to access the operational database is received from a user, and in response to receiving the request from the user, create a registration record for the user, wherein when the user is done accessing the operational database or when the user's access has been terminated the registration record is deleted; and instructions to determine if the registration record exists:

if the registration record exists, then instructions to not initiate the final archive; and if the registration record does not exist, then instructions to initiate the final archive, wherein no changes are allowed to the operational database during the final archive.

16. The non-transitory computer readable medium of claim 15, wherein the number of sub-archives is further based on at least one of:

a defined number of sub-archives; and a maximum number of sub-archives.

17. The non-transitory computer readable medium of claim 15, wherein the delay time of each of the plurality of sub-archives is further based on an administered value.

* * * * *